United States Patent [19]

Asari et al.

[11] Patent Number: 4,945,499

[45] Date of Patent: Jul. 31, 1990

[54] GRAPHIC DISPLAY SYSTEM

[75] Inventors: Naosuke Asari; Nobuyuki Sakamoto, both of Tokyo, Japan

[73] Assignee: Seiko Instruments, Inc., Tokyo, Japan

[21] Appl. No.: 296,061

[22] Filed: Jan. 12, 1989

[30] Foreign Application Priority Data

Jan. 13, 1988 [JP] Japan .................................... 63-5461

[51] Int. Cl.[5] ................................................ G06F 3/14

[52] U.S. Cl. ...................................... 364/521; 364/900

[58] Field of Search ... 364/200 MS File, 900 MS File, 364/518, 521; 340/721, 734, 798, 799

[56] References Cited

U.S. PATENT DOCUMENTS

| | | | |
|---|---|---|---|
| 4,103,331 | 7/1978 | Thacker | 364/200 |
| 4,555,775 | 11/1985 | Pike | 364/900 |
| 4,677,575 | 6/1987 | Redin | 364/518 X |
| 4,736,309 | 4/1988 | Johnson et al. | 364/900 X |
| 4,782,442 | 11/1988 | Kojima et al. | 364/200 |
| 4,845,631 | 7/1989 | Bottorf | 364/521 X |
| 4,870,599 | 9/1989 | Hempel et al. | 364/521 X |
| 4,890,257 | 12/1989 | Anthias et al. | 364/900 |

*Primary Examiner*—David L. Clark

*Attorney, Agent, or Firm*—Spensley Horn Jubas & Lubitz

[57] ABSTRACT

Graphic display controller having central processing unit for preparing display lists so that a graphic display controller displays graphics on a monitor by using the display lists. The controller incvludes a memory for storing original image data as a part of the data base. The memory is accessed by the central processing unit through a memory management unit. The memory management unit maps locical process address to physical address on the memory unit. The memory has a capacity for storing display lists. The graphic display controller directly accesses the display lists stored in the memory through a graphic address transformer. The graphic address transformer maps graphic addresses to physical addresses.

22 Claims, 9 Drawing Sheets

GRAPHIC DISPLAY SYSTEM

BACKGROUND OF THE INVENTION

This invention relates to a graphic display system for use in computer graphics.

In a conventional graphic display system, a segment buffer for display lists is provided in a data memory unit in a graphic controller 22 as shown in FIG. 2. The display lists stored in the segment buffer 21 of the data memory unit are prepared by processes which are executed by a central processing unit 14. These display lists are read out and processed by the graphic display controller 22 and graphics are displayed on a monitor 13 based on the display lists.

The process to be executed by the central processing unit 14 is executed in the following way. Data of the original of the graphic image to be displayed are stored in the main memory 16 as a part of, for example, a CAD data base. In general, the graphic display controller cannot use directly the original data. Therefore, the central processing unit 14 accesses the data with process addresses through memory management unit 15 in order to convert them to the display lists that can be used by the graphic display controller 22. The display lists are then stored in the segment buffer 21 contained in the graphic display controller 22 through the memory management unit 15. Thereafter, the graphic display controller 22 accesses the display lists stored in the segment buffer 21 with graphic addresses and displays the graphic image on the monitor 13. Therefore, the copying and moving of data occurs a large number of times and also data conversion processing performed by the central processing unit 14 is necessarily required even when a part of the original data can be used directly by the graphic controller. As a result, the processing speed of the graphic display system is slow.

A sufficiently large segment buffer 21 is necessary in order to store the display lists and this results in increased costs of production. Moreover, the segment buffer memory area in the graphic controller 22 is used solely for holding the display lists and cannot be used as the memory area for other purposes. On the other hand, the segment buffer 21 in the graphic display controller 22 has a limited memory capacity, and display lists exceeding this memory capacity cannot be stored.

The memory area accessed in the process to be executed by the central processing unit 14 is determined through the mapping from the logical address of the process to the physical address of the main memory 16 by the memory management unit 15 and is prepared in the main memory 16. For this reason, the graphic display controller cannot determine the physical address of the data stored in the main memory and therefore cannot access directly the data in the process even when data can be used directly by the graphic display controller.

SUMMARY OF THE INVENTION

It is therefore an object of the invention to provide a graphic display system in which a graphic controller can directly access display lists stored in a main memory so that the overall processing speed thereof is greatly increased.

It is another object of the present invention to provide a graphic display system in which a graphic controller is not required to have a capacity for display lists and therefore to provide an economical graphic display system.

It is a further object of the present invention to provide a graphic display system in which the process address can be used as such as the graphic address.

These and other objects of the invention are accomplished by a graphic display system which comprises processing means for processing processes for preparing display lists from original graphic image data having accessing means for accessing memory means with process addresses, memory means for storing original graphic image data having segment buffer capacity for storing said display lists under physical addresses, memory management means connected between said processing means and said memory means for mapping said process addresses to physical addresses, graphic display controller for generating signals representing graphic images having second processing means for processing said display lists and second accessing means for accessing said display lists with graphic addresses, graphic address transformer connected between said graphic display controller and said memory means for mapping said graphic addresses to said physical addresses, and monitor means connected with said graphic display controller for displaying graphic images thereon.

DETAILED DESCRIPTION OF THE PREFERRED EMBODIMENTS

The present invention will be described in detail with reference to the drawings.

Figure 1:
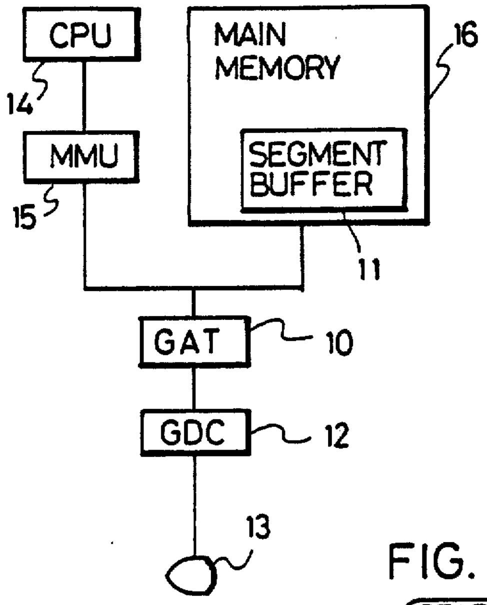
FIG. 1 is a block diagram of a graphic display system according to the present invention.
Figure 2:
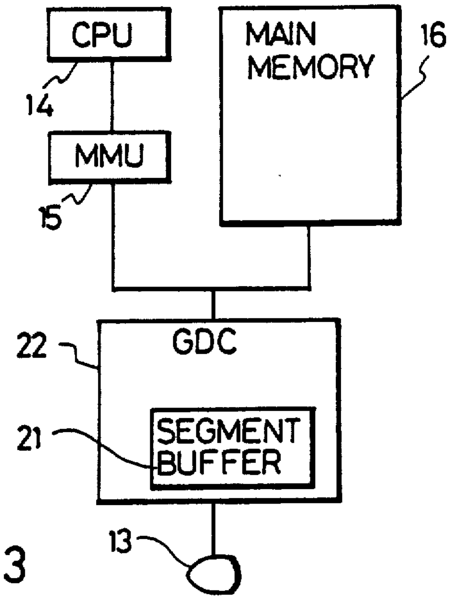
FIG. 2 PRIOR ART
FIG. 2 is a block diagram of a conventional graphic display system.

As shown in FIG. 1, the graphic display system in accordance with one embodiment of the present invention comprises a central processing unit (CPU) 14, a memory management unit (MMU) 15 connected to the central processing unit 14, a main memory 16 connected to the memory management unit 15, a graphic address transformer (GAT) 10 connected to the memory management unit 15 and to the main memory 16, a graphic display controller (GDC) 12 connected to the graphic address transformer 10, and a monitor 13 connected to the graphic display controller 12. A process is executed in the CPU 14 under the management of an operating system. This process accesses data stored in the main memory 16 under a continuous process address in a logical address space as a part of, for example, a CAD data base, through memory management unit 15 for the purpose of display list preparation processing. The continuous logical process address is mapped to physical addresses containing discontinuities as a data memory area in the main memory, to which access is made by the process, by the memory management unit 15. The process executed in the central processing unit 14 accesses the graphic display controller 12 through the memory management unit 15 and the graphic address transformer 10 for executing instructions of display list processing, or the like. The graphic display controller 12 accesses a segment buffer 11 in the main memory 16 for display processing of the display list through the continuous graphic address. The continuous graphic address is mapped to the physical address of the main memory 16 containing discontinuities by the graphic address transformer 10. The graphic display controller 12 displays the graphic image on the monitor 13 by processing the display lists accessed from the main memory 16.

Figure 3:
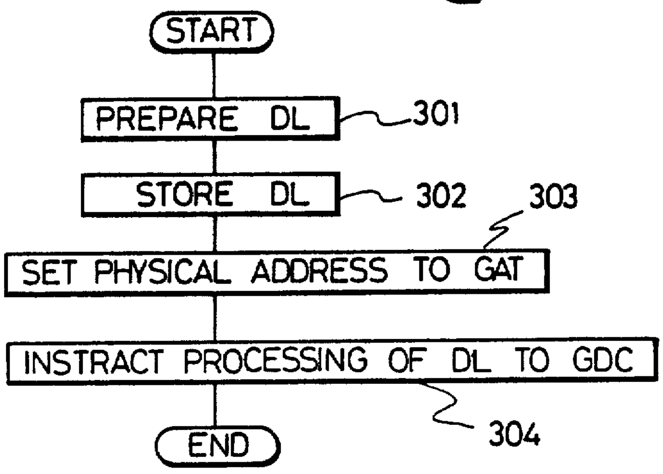
FIG. 3 is a programming flow chart showing the processing procedure in a central processing unit according to the invention.

The display lists in the graphic display system are processed in the following way. First of all, as shown in FIG. 3, performance of the process which is executed in the central processing unit 14 is started. The process in the central processing unit 14 prepares the display list of the graphic image to be displayed at step 301 from the original graphic image data. Next, at the step 302, the process stores the display list in the segment buffer 11 in the main memory 16 by accessing the main memory with process address through the memory management unit 15.

Figure 4:
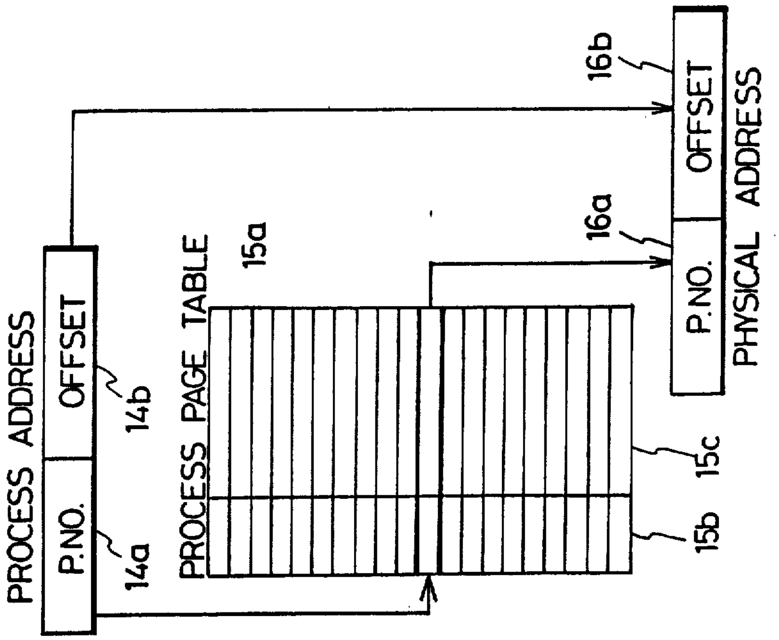
FIG. 4 is a diagram showing an address mapping method for a memory management unit.

Referring to FIG. 4 which is an explanatory view of the address mapping method of the memory management unit, the process address of the process executed on the CPU is divided into a process page number **14*a* and a process page offset 14*b*. The memory management unit has a process page table 15*a* comprising a plurality of numbered entries. Each entry of the page table holds the management data 15*b* and the physical page number 15*c* of the main memory. In the mapping method of the process address to the physical address of the main memory, the process page number 14*a* in the process address represents the entry number of the process page table and the physical page number 15*c* held by that entry is used as the physical page number 16*a* of the physical address of the main memory 16. The process page offset of the process address 14*b* is used as such as the physical page offset of the physical address 16*b* of the main memory 16. The management data 15*b*** represents validity of the physical page number.

Figure 5:
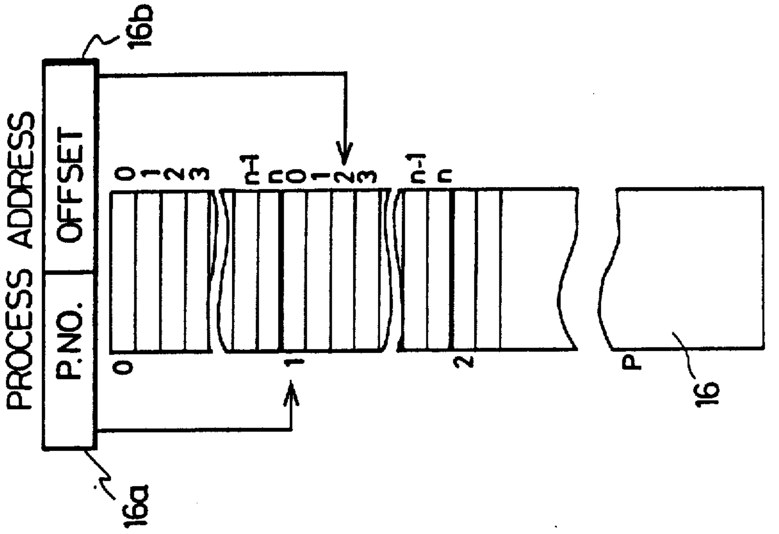
FIG. 5 is a diagram showing the correspondence between physical addresses and the actual memory area.

Referring to FIG. 5, which shows the correspondence relation between the physical address of the main memory and the memory area, the physical address of the main memory 16 is divided into the physical page number and the physical page offset. The memory area in the main memory 16 is divided into a plurality of blocks and each block has a physical page number. The physical page number of the physical address represents the physical page of the memory area. The physical page offset represents the relative position inside the physical page.

Figure 6:
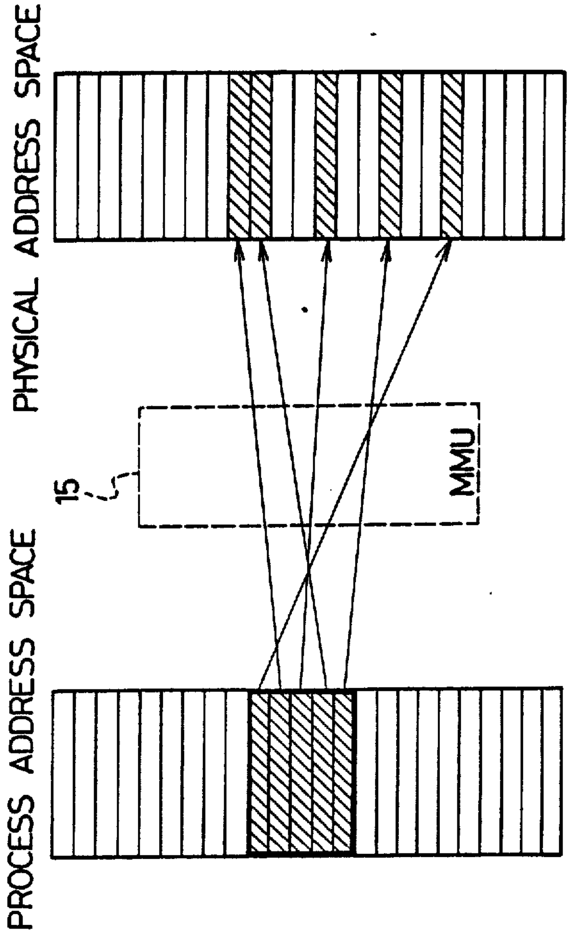
FIG. 6 is a diagram illustrating the allotment of segment, buffer in a process address space.

On the basis of the explanation given above, reference is made to an explanatory view of the segment buffer allotment shown in FIG. 6. The segment buffer 11 accessed from the process executed on the central processing unit 14 exists as the continuous address in the process address space. In practice, however, it is mapped as, and corresponds to, the discontinuous memory area in the main memory 16, that is, the discontinuous physical page, by the memory management unit 15 described above.

Returning to FIG. 3, at the next step 303, the physical page number of the segment buffer 11 storing the display list is taken out from the process page table in the memory management unit 15 and set to the entry having the same entry number of a graphic page table in the graphic address transformer 10. At the next step 304, the central processing unit 14 instructs the processing of display list to the graphic display controller 12.

Figure 7:
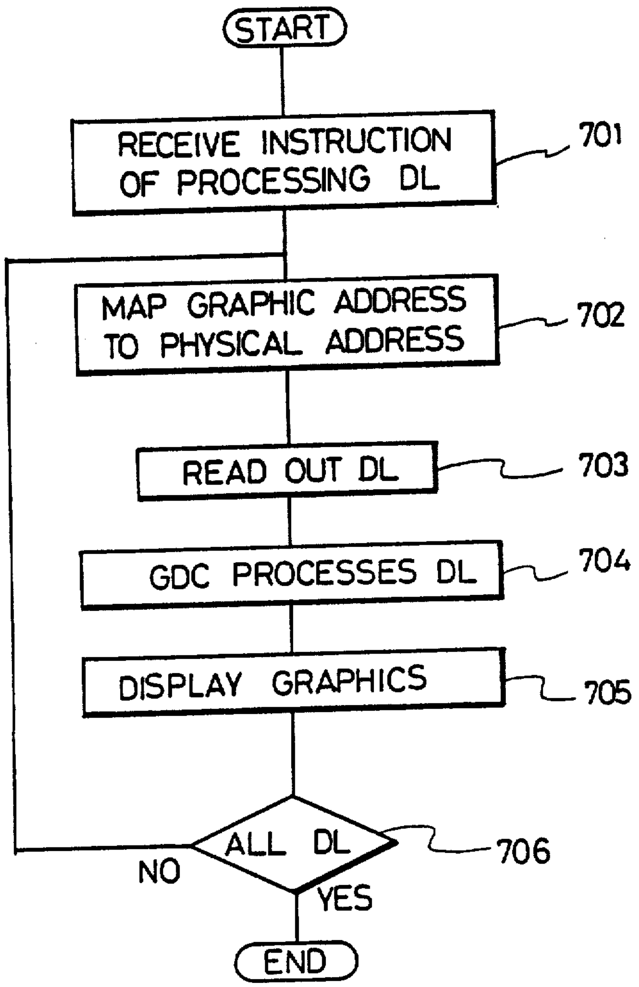
FIG. 7 is a programming flow chart showing the processing procedure in a graphic address transformer and a graphic display controller.

Next, the processing of the display list in the graphic display system shifts to the graphic address transformer 10 and to the graphic display controller 12 as shown in FIG. 7. First of all, at the step 701, the graphic display controller 12 receives the instruction for processing of the graphic data from the central processing unit 14. At the next step 702, the graphic display controller 12 accesses the display list in the main memory means 16 with graphic address through the graphic address transformer 10.

Figure 8:
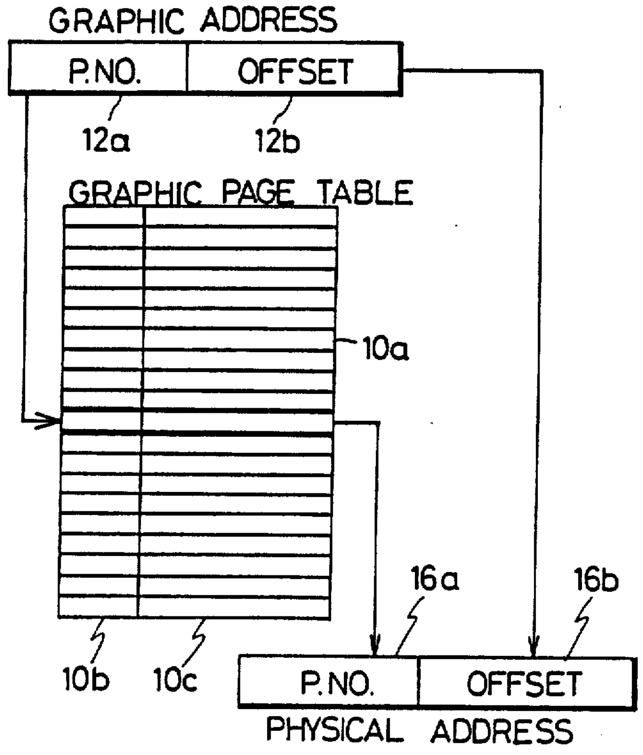
FIG. 8 is a diagram illustrating an address mapping method of a graphic address transformer.

Referring to an explanatory view of the address mapping method of the graphic address transformer shown in FIG. 8, the graphic address used when the graphic display controller 12 accesses the display list is divided into the graphic page number **12*a* and the graphic page offset 12*b*. The graphic address transformer 10 holds the graphic page table 10*a* comprising the plurality of numbered entries. Each entry of the graphic page table holds the management data 10*b* and the physical page number 10*c* of the main memory 16. The graphic page number 12*a* represents the entry of the graphic page table 10*a* and the physical page number 10*c* held by that entry is used as the physical page number 16*a* of the physical address of the main memory 16. The graphic page offset 12*b* of the graphic address becomes as such the physical page offset 16*b* of the physical address of the main memory 16**.

Figure 9:
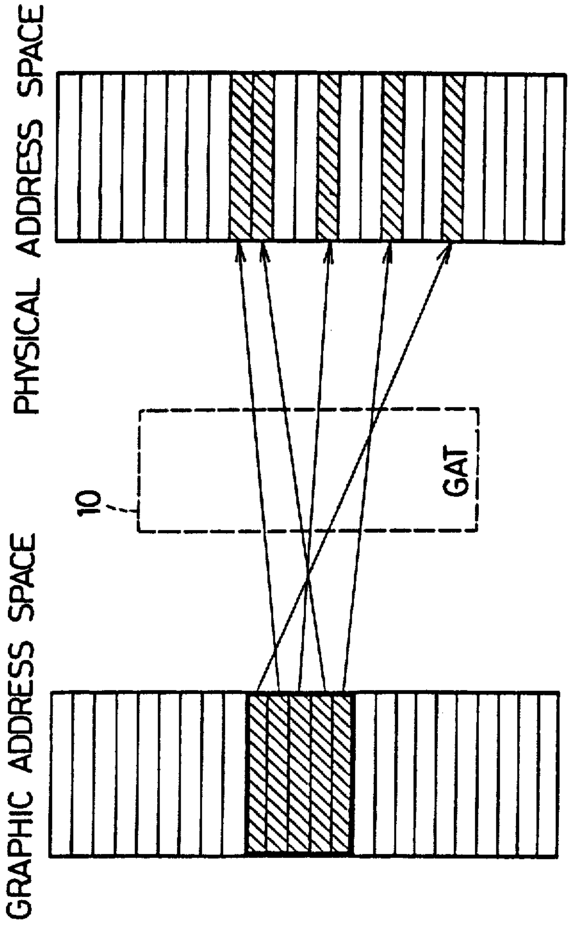
FIG. 9 is a diagram illustrating the allotment of segment buffer in a graphic address space.

On the basis of the description given above, reference is made to an explanatory view of graphic data area allotment shown in FIG. 9. The segment buffer 11 accessed from the graphic display controller 12 exists as the continuous address in the graphic address space.

In practice, however, it is mapped as, and corresponds to, the memory area containing discontinuities inside the main memory 16, that is, the discontinuous physical page, by the graphic address transformer 10.

On the basis of the description given above, the graphic page table held by the graphic address transformer 10 is prepared in the following way. First of all, the graphic data to be displayed on the monitor 13 are prepared by the process executed in the central processing unit 14 inside the continuous segment buffer in the process address space.

In practice, however, this continuous segment buffer area corresponds to the physical page in the main memory 16 containing discontinuities. Next, before the process executed on the central processing unit 14 instructs the processing of the display list by the graphic display controller 12, the physical page number held by the entry of the process page table corresponding to the continuous segment buffer of the process address space is used as the physical page number in the same or easily convertible entry of the graphic page table corresponding to the continuous segment buffer of the graphic address space. This processing is made for all of the continuous segment buffer.

Returning to FIG. 7, at the step 703 succeeding to the step 702 described above, the graphic address transformer 10 maps the graphic address to the physical address of the main memory 16 by the method described above and accesses the display list in the segment buffer 11 contained in the main memory 16 at the step 704. At the next step 705, the graphic display controller 12 processes the display list read out from the main memory 16 and displays the graphics on the monitor 13 at the step 706. At the next step 707, whether or not all the display lists have been processed is examined and if there remains any unprocessed display list, the flow from the step 702 is repeated.

When the method described above is repeated or when the same method is carried out for a process different from the process described above, the graphic display system of the present invention can be applied under the condition where a plurality of processes are executed.

The present invention can provide the following effects because the graphic display controller 12 can access directly the segment buffer 11 in the main memory 16 through the graphic address transformer 10.

(1) Since the graphic display controller 12 can directly access the main memory 16 holding the data as the original of the graphic image of the process executed in the central processing unit 14 and can effect graphic display processing, the overall processing speed of the graphic display system can be improved drastically.

(2) The graphic data memory area 21 in the graphic display controller 22 becomes unnecessary and an economical graphic display system can be produced.

(3) The memory capacity of the graphic data depends solely on the capacity of the main memory 16 and is not effected by the capacity of the memory of the graphic display controller 12.

(4) Since the address mapping method in the graphic address transformer 10 is analogous to the address mapping method in the memory management unit 15, the process address can be used as such as the graphic address.

Therefore, the segment buffer 11 in the main memory 16 need not always be a continuous memory area. If the memory management unit employs the paging method, the segment buffer 11 contained in the main memory means 16 can be divided into pages.

Figure 10:
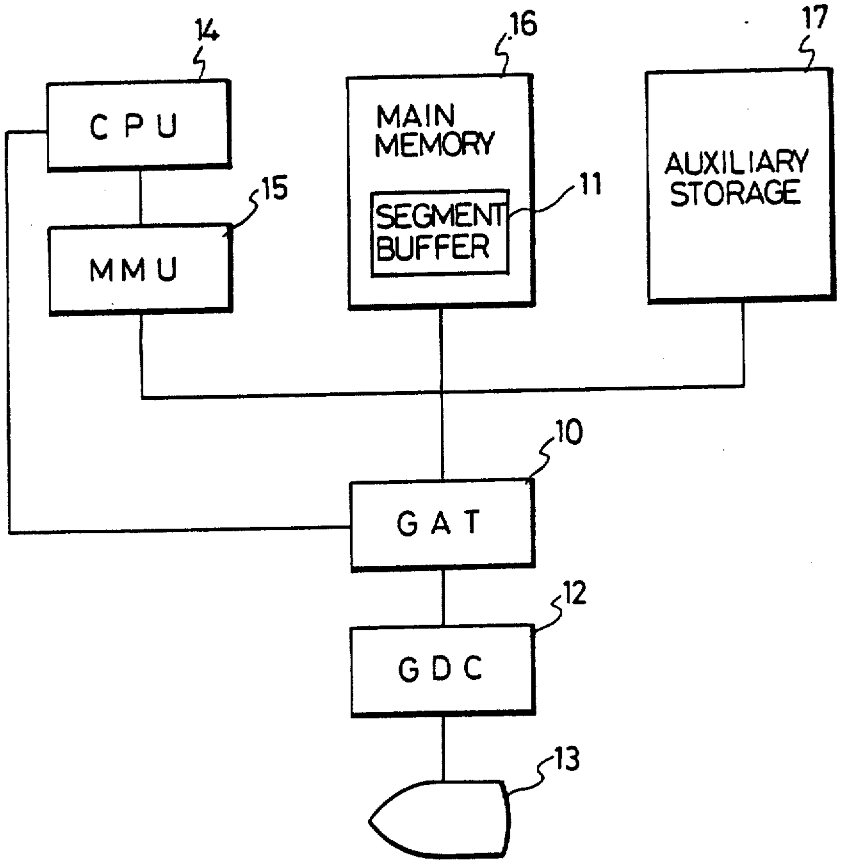
FIG. 10 is another block diagram of a graphic display system according to the present invention.

FIG. 10 shows another embodiment of the graphic display system in accordance with the present invention comprising CPU 14, memory management unit 15 connected to CPU 14, main memory 16 connected to memory management unit 15 and having a segment buffer 11, auxiliary storage 17 connected to memory management unit 15 in parallel with main memory 16, graphic address transformer 10 connected to CPU 14, to the memory management unit 15 and to the main memory 16, graphic display controller 12 connected to graphic address transformer 10, and monitor 13 connected to graphic display controller 12. The difference between first and second embodiments is that the second embodiment has the auxiliary storage 17 to establish a virtual segment buffer system.

The CPU 14 executes a process under the management of an operating system. This process accesses data stored in the main memory 16 under a continuous address in a logical address space as a part of, for example, a CAD data base, through memory management unit 15 for the purpose of preparation processing of the display list. The continuous process address is mapped by the memory management unit 15 to a physical address containing discontinuities as a segment buffer area in the main memory 16.

The display lists in the graphic display system are processed in the same way as in the first embodiment. First of all, as shown in FIG. 3, performance of the process which is executed in the central processing unit 14 is started. The process in the central process unit 14 prepares the display list of the graphic image to be displayed at step 301. Next, at the step 302, the process stores the display list in the segment buffer area 11 contained in the main memory 16 through the memory management unit 15. At this time, not all the display lists are stored in the main memory 16 under control of the operating system and part of the display lists is stored in the auxiliary storage 17. At this step, information of whether display list is stored in the main memory or not is written into the management data area of the process page table. At the next step 303, the CPU 14 tests whether the display list exists in the main memory by referring to the management data of the process page table. If the display list actually exists in the main memory 16, the physical address of the segment buffer area 11 is taken out from the physical page area of the page table in the memory management unit 15 and set to the same entry of the graphic page table in graphic address transformer 10. And the information of validity of the graphic address is written in the management data area of the same entry. If the graphic data does not actually exist on the main memory 16, the CPU writes the information of page number invalid in the management data area of the same entry although the page number is set to the same entry of the graphic page table. At the next step 304, the CPU 14 instructs the processing of display list to the graphic display controller 12.

Figure 11:
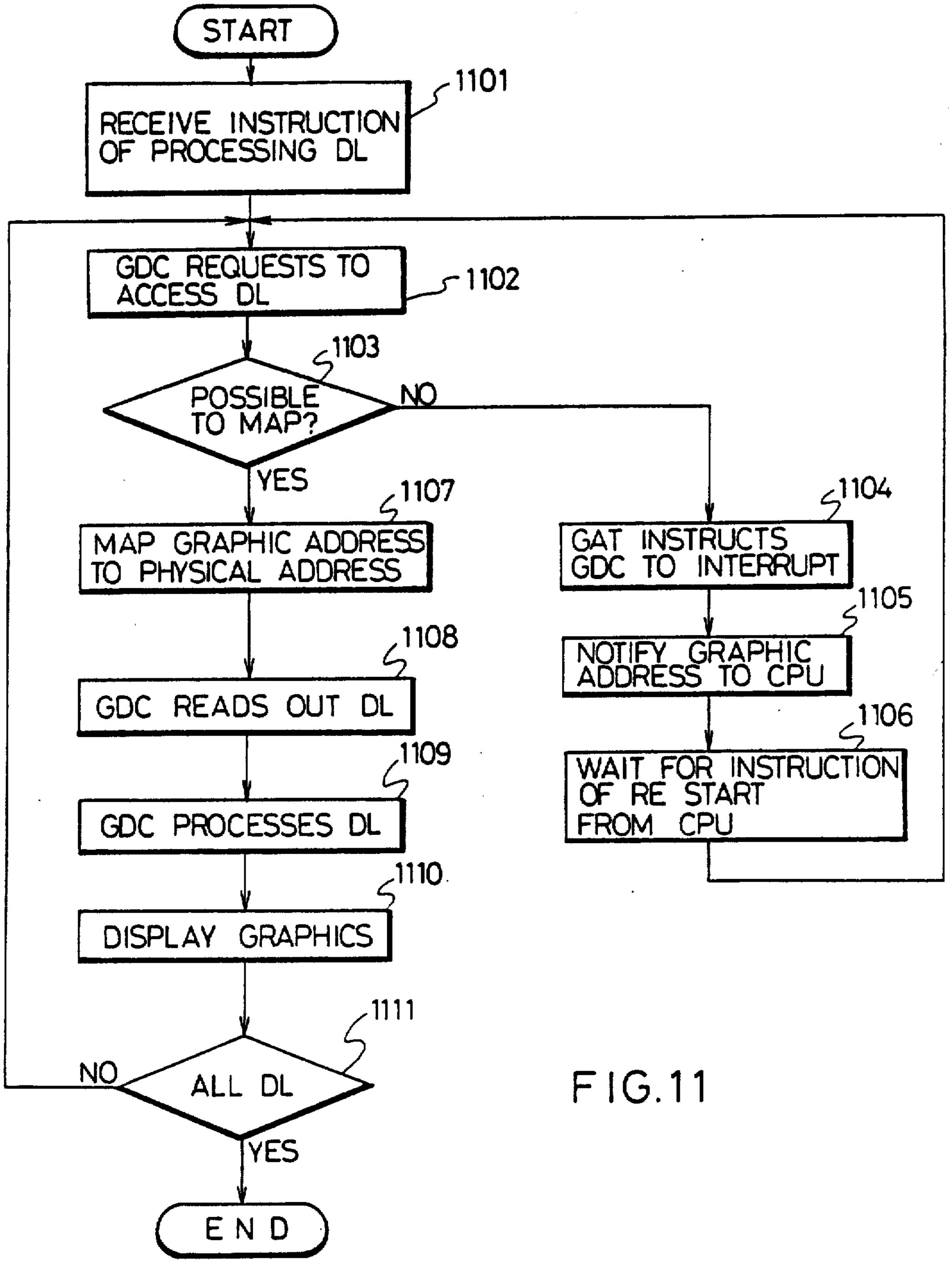
FIG. 11 is a programming flow chart showing the processing procedure in a graphic address transformer and a graphic display controller.

Next, the processing of the graphic data in the graphic display system shifts to graphic address transformer 10 and to graphic display controller 12 as shown in FIG. 11. First of all, at the step 1101, the graphic display controller 12 receives the instruction of processing of the display list from the CPU 14. At the next step 1102, the graphic display controller 12 requests to access the display list in the main memory 16 through the graphic address transformer 10. At the next step 1103, the graphic address transformer 10 refers to the management data of the graphic page table 10*a* in the graphic address transformer 10 and recognizes whether the address mapping processing for mapping the graphic address to the physical address of the main memory 16 by the graphic address transformer 10 is possible or is not possible.

The content of the address mapping processing for mapping the graphic address to the physical address in graphic address transformer will be explained. The graphic address transformer 10 receives the graphic address from the graphic display controller 12 and maps it to the physical address of the main memory 16 by its internal graphic page table. The graphic address consists of a graphic page number and a graphic page offset.

The physical address of the main memory means 16 consists of a physical page number and a physical page offset. The graphic page table consists of the aggregate of data structures called "entry" for holding the management information of its page frame. The data structure of this entry consists of management data and the physical page number. The management data of this entry represents whether the physical page number of the entry is effective or invalid. In the address mapping of the graphic address to the physical address by the graphic address transformer 10, the graphic page number of the graphic address represents the entry of the graphic page table. If the management data of this entry represents invalidity of physical address, address mapping is made impossible. If the management data of the entry represents that the physical address is effective, the physical page number of this entry is used as the physical page number of the physical address of the main memory and the graphic page offset of the graphic address is used as the physical page offset of the physical address. Here, the mapping processing from the graphic address to the physical address is completed.

Referring again to FIG. 11, the graphic address transformer 10 confirms at step 1103 whether or not the address mapping from the graphic address to the physical address of the main memory means 16 is possible by the method described above, and if it is possible, the flow then shifts to the step 1107 and if not, the flow shifts to the step 1104.

At the step 1107 following step 1103 described above, the graphic address transformer 10 maps the graphic address to the physical address of the main memory 16 by the method described above and the display list in the segment buffer 11 contained in the main memory 16 is accessed at the step 1108. At the next step 1109, the graphic display controller 12 processes the display list read out from the main memory 16 and displays the graphics on the monitor at the step 1110. At the next step 1111, whether or not all the display lists have been processed is examined and if there remains any unprocessed display list, the flow from the step 1102 is repeated.

The step 1104 succeeding to the step 1103 is performed when address mapping is not possible. The graphic address transformer 10 does not access the main memory 16 but instructs the graphic display controller 12 to interrupt the access of the display list data. At the next step 1105, the graphic address transformer 10 notifies the address-inconvertible graphic address to the CPU 14 and at the step 1106, waits for the instruction of re-start of the address conversion processing from CPU 14. On receiving the interruption of reference of the graphic data at the step 1104, the graphic display controller 12 immediately interrupts the access of the display list and waits for the instruction of restart of the access of the graphic data from the graphic address transformer 10.

Figure 12:
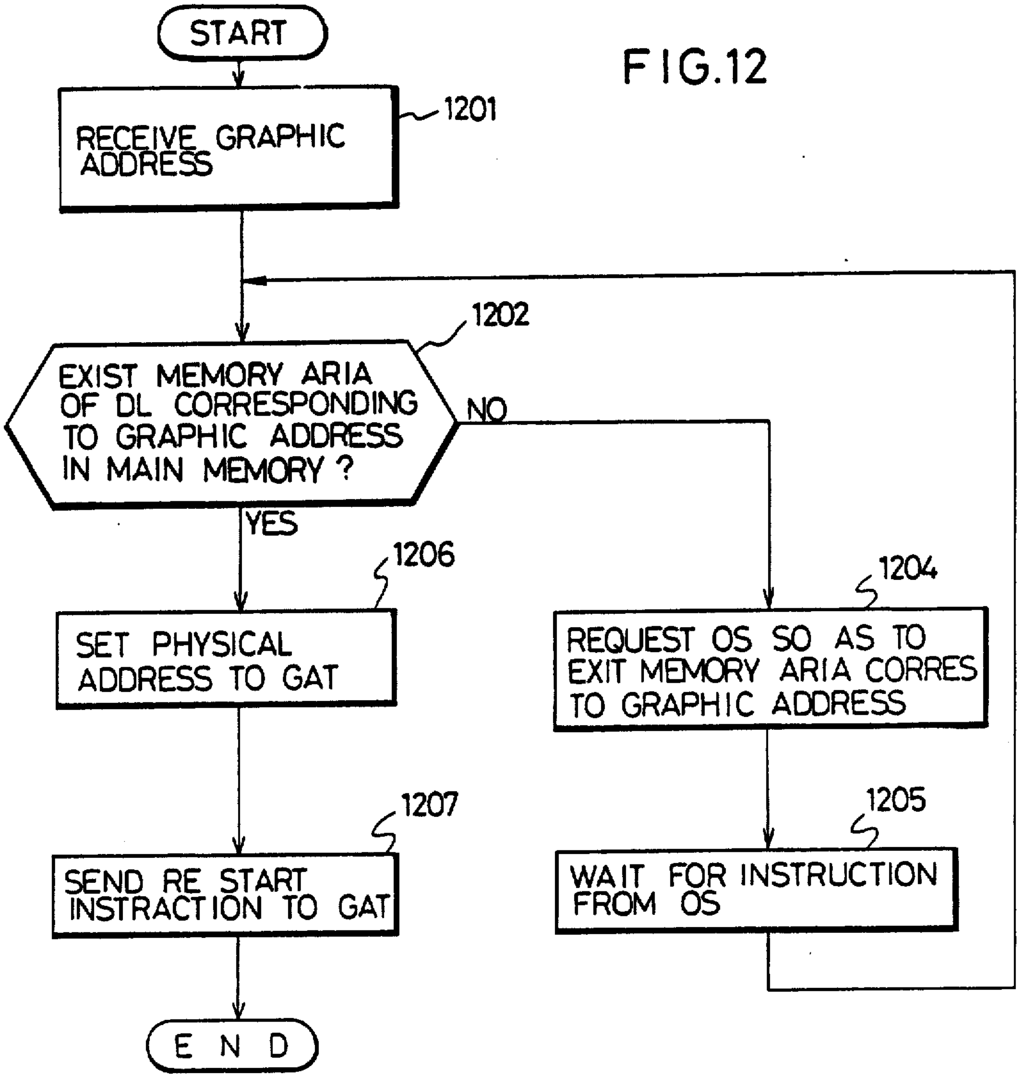
FIG. 12 is a programming flow chart showing the processing procedure of the central processing unit in the case of nonexisting data.

Referring now to FIG. 12, the processing by which CPU 14 makes the graphic data exist, when such data does not exist actually in the main memory means 16, will be explained. First of all, at the step 1201, the central processing unit 14 receives the notice of the address-inconvertible graphic address from graphic address transformer 10. At the next step 1202, whether or not the physical page number of the segment buffer 11 corresponding to the graphic address exists actually in the main memory 16 is examined by referring to the management data of the process page table. If the segment buffer 11 holding the display list actually exists in the main memory 16 at the step 1202, the flow shifts to the step 1206 and if it does not, the flow shifts to the step 1204.

At the step 1204 succeeding to the step 1202 described above, the central processing unit 14 reads out the display list corresponding to the graphic address, for which address mapping is judged impossible, from the auxiliary storage 17 under control of the operating system and stores it in the segment buffer 11 in the main memory 16 and rewrites the process page table, both management data and page number. At the next step 1205, response from the operating system is waited for and then the flow shifts to the step 1202 to repeat the processing.

At the step 1206 succeeding to the step 1202 described above, the central processing unit 14 sets the page number of the segment buffer 11 storing the display list to the physical page number area and management data representing that page number is valid to the management data area of the graphic address transformer at the same entry as that of the process page table. At the next step 1207, the restart of the address mapping processing is indicated to the graphic address transformer 10.

Turning back again to FIG. 11, restart of processing of the display list will be explained. At the step 1106, the graphic address transformer 10 receives the instruction of restart of the address mapping processing from the central processing unit 14 and instructs the restart of the access of the display list that has been interrupted to graphic display controller 12. The flow then shifts to the step 1102 and the processing is continued until all the display lists are processed. On receiving the instruction of the restart of the access of the display list, graphic display controller 12 accesses the display list to the main memory 16 through graphic address transformer 10, processes the display list and displays the graphic image on the monitor 13.

The graphic display system can make graphic processing of even those display lists which do not actually exist in the main memory 16 by repeating the processing described above and can display the graphic image on the monitor 13.

Though the embodiment described above employs the page management method as the address mapping method in the memory management unit 15 and in the graphic address transformer 10, other methods such as segment management can also be employed. Though the existence of the display list corresponding to mapping an impossible graphic address in the main memory 16 is confirmed by the central processing unit 14 in the embodiment described above, it is also possible to employ the method wherein confirmation is made by the graphic address transformer 10 or graphic display controller 12 and if the graphic data exists actually in the main memory 16, the access processing of the display list is continued.

The present embodiment employs the construction wherein the graphic data are placed in the main memory, the graphic display controller accesses directly the display list through the graphic address transformer, display lists which do not exist actually in the main memory 16 are transferred from the auxiliary storage to the main memory, whenever necessary, and access can thus be made to these display lists from the graphic display controller through the graphic address transformer as if they were always existent in the main memory. Accordingly, this embodiment provides the following advantages in addition to those of the first embodiment.

(1) Limitation of the size of the display list to be displayed is practically eliminated and even a large display list can be display-processed.

(2) Since the display list to be displayed can be handled as such, processing such as graphic division becomes unnecessary and the processing speed of the graphic display system can be improved.

(3) Since the display lists are made to exist in the main memory 16 whenever they become necessary, occupation of the segment buffer area of the main memory 16 is eliminated and the overall processing speed of the graphic display system can be improved drastically.

(4) The cost of manufacture of the system can be reduced because a large main memory is not necessary.

This application relates to subject matter disclosed in Japanese Application No. 63-5461, filed on Jan. 13, 1988, and Japanese Application No. 61-314959, filed Dec. 25, 1986, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A graphic display system for displaying graphic images on a monitor comprising:

first processing means for executing processes for preparing display lists from original graphic image data, said first processing means having first accessing means for providing process addresses:

memory means having memory locations associated with physical addresses for storing original graphic image data and having segment buffer capacity for storing the display lists at the physical addresses;

memory management means connected between said processing means and said memory means for mapping the process addresses to the physical addresses;

graphic display controller means for generating signals representing graphic images, said controller means having second processing means for processing the display lists and second accessing means providing graphic addresses for accessing said display lists;

graphic address transformer means connected between said graphic display controller and said memory means for mapping the graphic addresses to the physical addresses; and monitor means connected to said graphic display controller for displaying graphic images under control of a display list.

2. A graphic display system as claimed in claim 1 further comprising auxiliary storage means connected with said first processing means in parallel with said memory means for storing a part of the display lists.

3. A graphic display system as claimed in claim 2 wherein said graphic address transformer means includes means for notifying said first processing means of graphic addresses not capable of address mapping when address mapping is not possible.

4. A graphic display system as claimed in claim 3 wherein said graphic address transformer means includes means for instructing said graphic display controller to interrupt accessing to said memory means through said graphic address transformer means when address mapping is not possible.

5. A graphic display system as claimed in claim 3 wherein said first processing means includes:

means for reading out the display lists designated by a provided graphic address from said auxiliary storage; and means for storing the read out display lists in said memory means.

6. A graphic display system as claimed in claim 5 wherein said first processing means includes means for instructing said graphic display controller means through said graphic address transformer means to restart accessing to said memory means after said first processing means store read out display lists in said memory means.

7. A graphic display system as claimed in claim 2 wherein each process address is composed of a process page number and a process page offset.

8. A graphic display system as claimed in claim 7 wherein said memory management means includes a process page table composed of a plurality of entries each designated by a process page number, and each entry has management data and a physical page number.

9. A graphic display system as claimed in claim 8 wherein said processing means has means for writing the process page table.

10. A graphic display system as claimed in claim 8 wherein each physical address is composed of a physical page number and a process page offset.

11. A graphic display system as claimed in claim 2 wherein each graphic address is composed of a graphic page number and a graphic page offset.

12. A graphic display system as claimed in claim 11 wherein said graphic address transformer means includes means storing a graphic page table composed of a plurality of entries designated by graphic page numbers, and each entry has a physical page number and management data for representing validity of the physical page number.

13. A graphic display system as claimed in claim 12 wherein said first processing means has second writing means for writing the graphic page table on the basis of the process page table.

14. A graphic display system as claimed in claim 12 wherein each physical address is composed of a physical page number and a graphic page offset.

15. A graphic display system as claimed in claim 1 wherein each process address is composed of a process page number and a process page offset.

16. A graphic display system as claimed in claim 15 wherein said memory management means includes a process page table composed of a plurality of entries each designated by a process page number, and each entry has management data and a physical page number.

17. A graphic display system as claimed in claim 16 wherein said processing means has means for writing the process page table.

18. A graphic display system as claimed in claim 16 wherein each physical address is composed of a physical page number and a process page offset.

19. A graphic display system as claimed in claim 1 wherein each graphic address is composed of a graphic page number and a graphic page offset.

20. A graphic display system as claimed in claim 19 wherein said graphic address transformer means includes means storing a graphic page table composed of a plurality of entries designated by graphic page numbers, and each entry has a physical page number and management data for representing validity of the physical page number.

21. A graphic display system as claimed in claim 20 wherein said first processing means has second writing means for writing the graphic page table on the basis of the process page table.

22. A graphic display system as claimed in claim 20 wherein each physical address is composed of a physical page number and a graphic page offset.

* * * * *